United States Patent
Park et al.

(10) Patent No.: US 9,432,930 B2
(45) Date of Patent: Aug. 30, 2016

(54) METHOD AND APPARATUS FOR TRANSMITTING LIST OF BEARERS IN WIRELESS COMMUNICATION SYSTEM

(71) Applicant: LG ELECTRONICS INC., Seoul (KR)

(72) Inventors: Kyung Min Park, Seoul (KR); In Sun Lee, Seoul (KR); Dae Wook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 14/222,628

(22) Filed: Mar. 22, 2014

(65) Prior Publication Data

US 2014/0286218 A1 Sep. 25, 2014

Related U.S. Application Data

(60) Provisional application No. 61/804,215, filed on Mar. 22, 2013.

(51) Int. Cl.
*H04W 52/02* (2009.01)
*H04W 48/12* (2009.01)
*H04W 92/12* (2009.01)
*H04W 92/20* (2009.01)

(52) U.S. Cl.
CPC ......... *H04W 52/0203* (2013.01); *H04W 48/12* (2013.01); *H04W 92/12* (2013.01); *H04W 92/20* (2013.01); *Y02B 60/50* (2013.01)

(58) Field of Classification Search
CPC ................ H04W 36/0027; H04W 36/0055; H04W 36/28; H04W 36/04; H04W 76/045; H04W 36/24; H04W 36/0072
See application file for complete search history.

(56) References Cited

U.S. PATENT DOCUMENTS

| 2013/0252660 | A1* | 9/2013 | Bach | ............................. 455/525 |
| 2014/0080484 | A1* | 3/2014 | Centonza | ............ H04W 76/045 455/436 |

* cited by examiner

*Primary Examiner* — Redentor Pasia
*Assistant Examiner* — Peter Mak
(74) *Attorney, Agent, or Firm* — Birch, Stewart, Kolasch & Birch, LLP

(57) ABSTRACT

A method and apparatus for transmitting a list of bearers in a wireless communication system is provided. A first eNodeB (eNB) of an energy saving cell configures a list of minimum required evolved-UMTS terrestrial radio access network (E-UTRAN) radio access bearers (E-RABs) or required E-RABs, and transmits the configured list of minimum required E-RABs or a required E-RABs to a second eNB of a compensation cell. Upon receiving the configured list of minimum required E-RABs, the second eNB checks whether the compensation cell is able to provide all E-RABs included in the list of minimum required E-RABs or not. Upon receiving the configured list of required E-RABs, the second eNB checks whether the compensation cell is able to provide E-RABs included in the list of required E-RABs or not.

12 Claims, 14 Drawing Sheets

FIG. 3
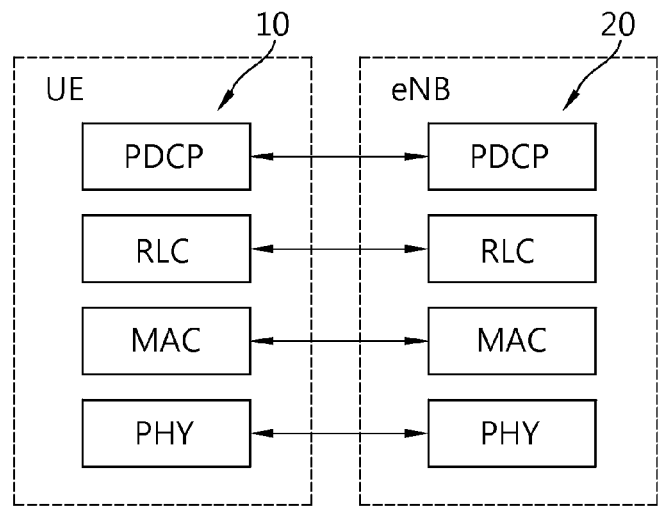
(a)
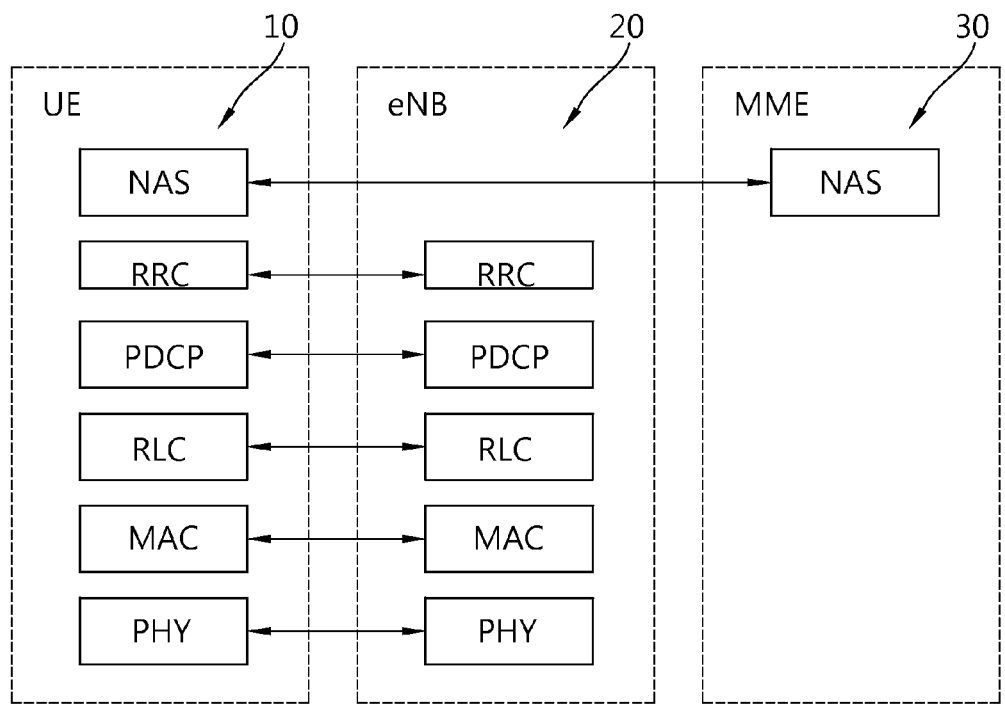
(b)

METHOD AND APPARATUS FOR TRANSMITTING LIST OF BEARERS IN WIRELESS COMMUNICATION SYSTEM

CROSS-REFERENCE TO RELATED APPLICATIONS

This application claims the benefit of priority of U.S. Provisional application No. 61/804,215 filed on Mar. 22, 2013, of which is incorporated by reference in its entirety herein.

BACKGROUND OF THE INVENTION

1. Field of the Invention

The present invention relates to wireless communications, and more particularly, to a method and apparatus for transmitting a list of bearers in a wireless communication system.

2. Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_ CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped o the signature sequence used to transmit messages between a UE and eNB and that either channel quality indicator (CQI)

or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

$$\text{Transmit power} = \text{TransmitPilot} - \text{RxPilot} + \text{ULInterference} + \text{Offset} + \text{SNRRequired}$$

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

In 3GPP LTE rel-12, energy saving issue of eNB is discussed. The power efficiency in the infrastructure and terminal should be an essential part of the cost-related requirements in LTE-A. There is a strong need to investigate possible network energy saving mechanisms to reduce carbon dioxide emission and operational costs (OPEX) of operators. In 3GPP LTE rel-9/10/11, specific work has been done for E-UTRAN network energy saving respectively, including:

Intra-eNB energy saving solution, e.g., configuring multicast broadcast single frequency network (MBSFN) subframes, etc., Inter-eNB cell switching on/off in overlapping scenario, Inter-RAT cell switching on/off and cell probing enhancement.

However, some significant issues are still remained undecided. For example, cell switching on enhancement has been introduced for inter-RAT energy saving scenario. Similar enhancement, e.g., Internet of thins (IoT) solution, probing, etc., have been discussed in 3GPP LTE rel-10 but not prioritized to be discussed for intra-LTE energy saving scenario. For another example, there has not been enough attention on effective solutions for inter-eNB non-overlapping energy saving for E-UTRAN so far. In 3GPP LTE rel-10, some potential solutions, e.g., operations and management (OAM) based solution, signaling-based solution and hybrid-based solution, have been generally described.

However, these solutions have not been fully discussed in 3GPP LTE rel-11, and the detail of the candidate solutions should be further identified.

Another problem that was briefly touched was the impact on QoS for end users during energy saving operation. In the current solutions, the network energy saving switching on/off is transparent for the users, and the only noticeable impact is that QoS of some users may be reduced when switching off high capacity nodes. Users paying additional fee to access services with higher QoS may not be in favor of accepting a lower QoS due to energy saving. Therefore, this case should be identified and corresponding solution could be further studied.

Furthermore, with considering the scenario and requirement of small cell enhancement in 3GPP LTE rel-12, energy efficiency is also a significant topic requiring further study. Therefore, once the small cell architecture is defined, the existing features need to be reviewed to verify their applicability and, if gaps are identified, the requirements for new solution or enhancements are to be studied.

Accordingly, discussions for identifying potential solutions for energy saving in non-overlapping scenario in E-UTRAN, and performing initial evaluation of possible enhancement in overlapping scenario, so that a subset of them can be used as the basis for further investigation and standardization, have been increased. Following may be discussed for enhancement of energy saving.

Inter-eNB energy saving solution for non-overlapping scenario,

Initial evaluation of a possible inter-eNB energy saving enhancement for overlapping scenario, e.g., switching on enhancement, considering UEs QoS requirement or subscriber type, etc.: potential solutions to guarantee end user's experience in energy saving and/or potential solution for intra-LTE inter-eNB switching on enhancement e.g., by selecting adequate nodes to be switched on, Identify intra-RAT energy saving issues and study corresponding energy savings solutions based on the defined use cases, requirements and deployment scenarios.

Based on the description above, a method for initiating to turn off a cell for energy saving effectively may be required.

SUMMARY OF THE INVENTION

The present invention provides a method and apparatus for transmitting a list of bearers in a wireless communication system. The present invention provides a method for transmitting a list of minimum required evolved-UMTS terrestrial radio access network (E-UTRAN) radio access bearers (E-RABs) in a wireless communication system. The present invention provides a method for transmitting a list of required E-RABs in a wireless communication system.

In an aspect, a method for transmitting, by a first eNodeB (eNB) of an energy saving cell, a list of bearers in a wireless communication system is provided. The method includes configuring a list of evolved-UMTS terrestrial radio access network (E-UTRAN) radio access bearers (E-RABs), and transmitting the configured list of E-RABs to a second eNB of a compensation cell.

The list of E-RABs may be a list of minimum required E-RABs.

The list of minimum required E-RABs may be a list of E-RABs which should be supported by the compensation cell in order to satisfy minimum required service qualities of user equipments (UEs) who are being served by the energy saving cell The method may further include receiving a response message, which indicates whether the compensation cell is able to provide all E-RABs included in the list of minimum required E-RABs or not, from the second eNB.

The list of E-RABs may be a list of required E-RABs.

The list of required E-RABs may be a list of E-RABs which are expected to be supported by the compensation cell.

The method may further include receiving a response message, which includes a list of E-RABs that the compensation cell is able to support, from the second eNB.

The list of E-RABs may include QoS parameters for each E-RAB includes in the list of E-RABs.

The method may further include receiving an energy saving request message from the second eNB.

The method may further include determining whether to turn off the energy saving cell or not.

The energy saving cell and the compensation cell may be macro cells.

The energy saving cell and the compensation cell may be pico cells.

In another aspect, a method for checking, by a second eNodeB (eNB) of a compensation cell, a list of bearers in a wireless communication system is provided. The method includes receiving a list of minimum required evolved-UMTS terrestrial radio access network (E-UTRAN) radio access bearers (E-RABs) from a first eNB of an energy saving cell, and checking whether the compensation cell is able to provide all E-RABs included in the list of minimum required E-RABs or not.

In another aspect, a method for checking, by a second eNodeB (eNB) of a compensation cell, a list of bearers in a wireless communication system is provided. The method includes receiving a list of required evolved-UMTS terrestrial radio access network (E-UTRAN) radio access bearers (E-RABs) from a first eNB of an energy saving cell, and checking whether the compensation cell is able to provide E-RABs included in the list of required E-RABs or not.

BRIEF DESCRIPTION OF THE DRAWINGS

FIG. 3 shows a user plane of a radio interface protocol of an LTE system.

DESCRIPTION OF EXEMPLARY EMBODIMENTS

Figure 1:
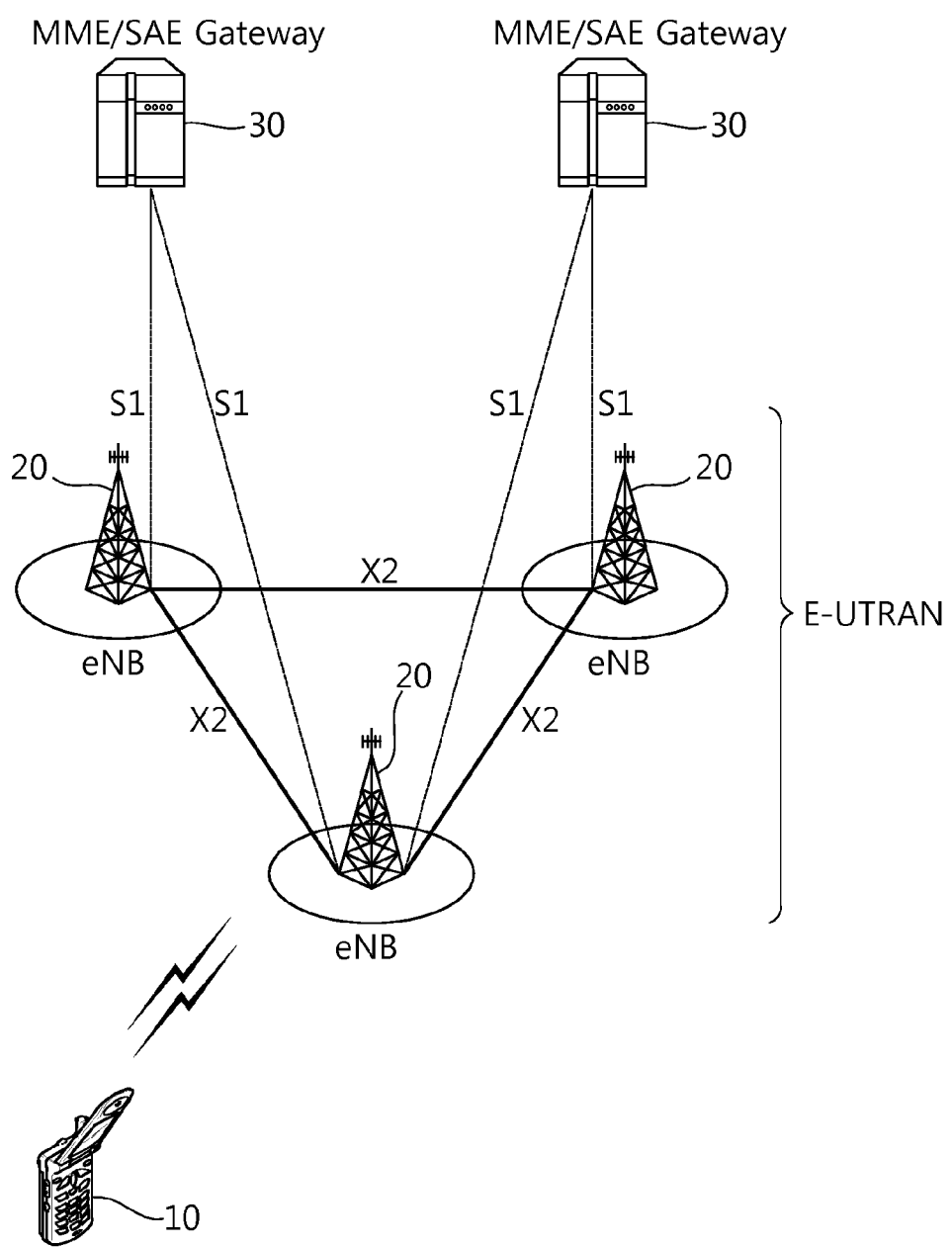
FIG. 1 shows LTE system architecture.
Figure 2:
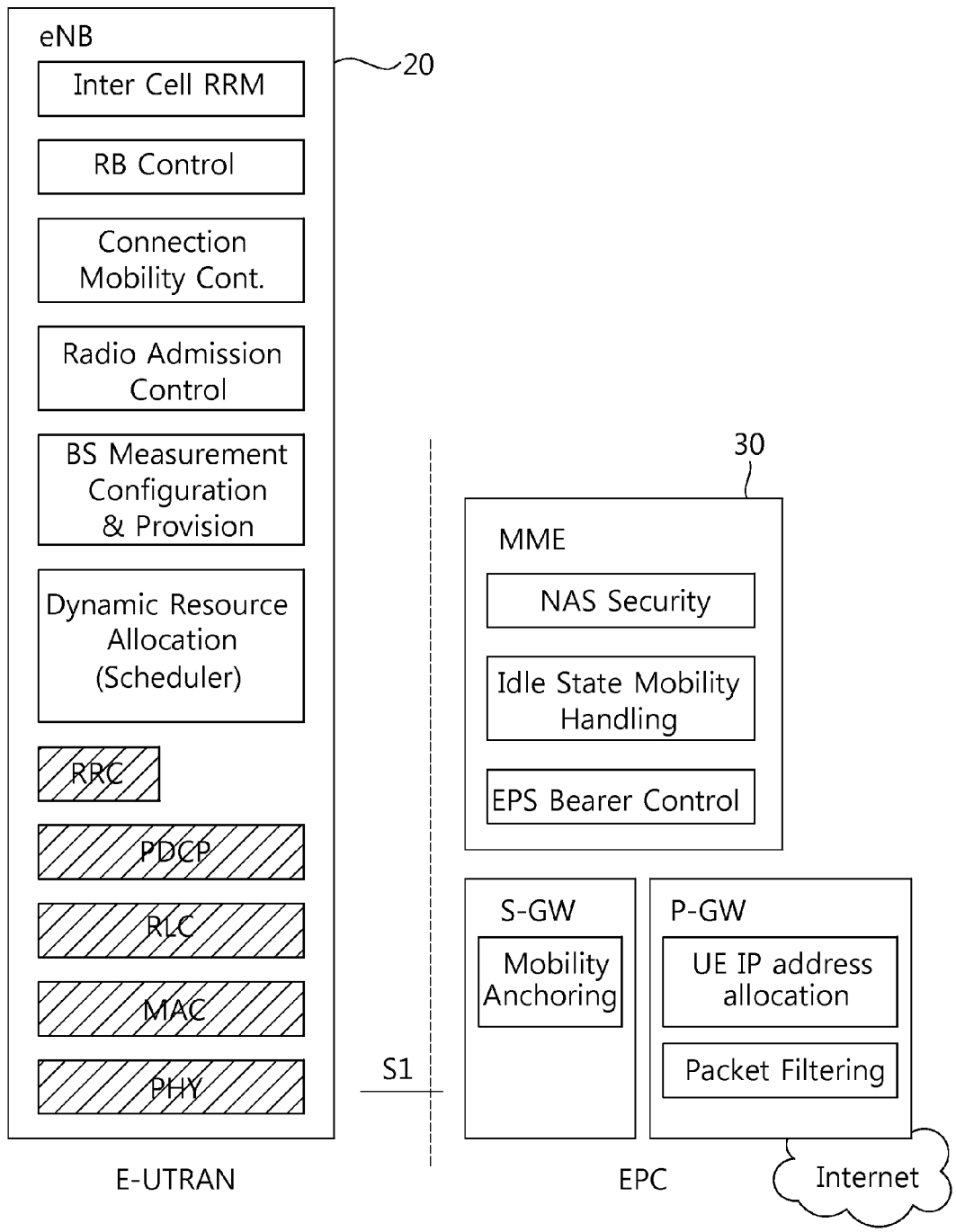
FIG. 2 shows a control plane of a radio interface protocol of an LTE system.
Figure 4:
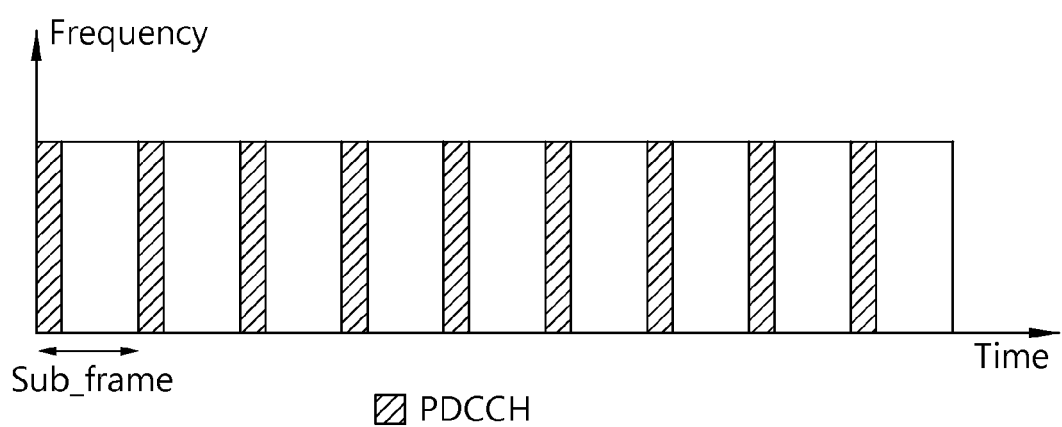
FIG. 4 shows an example of a physical channel structure.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Inter-eNodeB (eNB) energy saving is described. It may be referred to Section 6 of 3GPP TR 36.927 V11.0.0 (2012-09).

Inter-eNB energy saving scenario may be classified into an inter-eNB scenario 1 for energy saving and inter-eNB scenario 2 for energy saving. The inter-eNB scenario 1 for energy saving may be called an overlapping coverage scenario. In the overlapping coverage scenario, a second group of E-UTRAN cells are covered by a first group of E-UTRAN cells. The first group of E-UTRAN cells has been deployed to provide basic coverage, while the second group of E-UTRAN cells boosts the capacity. E-UTRAN cells which provide basic coverage may be called a coverage cell, and E-UTRAN cells which boost the capacity may be called a capacity booster cell. When some cells providing additional capacity are no longer needed, they may be switched off for energy optimization. In this case, both the continuity of LTE coverage and service quality of service (QoS) is guaranteed. If all cells have the same multiple public land mobile networks (PLMNs) in a network sharing scenario, there are no issues with the solutions to the inter-eNB scenario 1 for energy saving. In general, inter-eNB energy saving mechanisms should preserve the basic coverage in the network.

The inter-eNB scenario 2 for energy saving may be called a non-overlapping coverage scenario. In the non-overlapping coverage scenario, in order to reduce energy consumptions of such base station, the base station may be switched off And, in order to cover service area of the base station which is switched off, a neighboring base station may extend coverage thereof. In this case, a cell served by the base station which is switched off may be called an energy saving cell, and a cell served by the base station which extends coverage may be called a compensation cell. According to how the energy saving cells and compensation cells operate with each other, the inter-eNB scenario 2 for energy saving may involve two cases. For both cases, single layer coverage of E-UTRAN cells is deployed. At off-peak time, energy saving cells may enter dormant mode, while the basic coverage is provided by one cell or by several compensation cells. In general, the continuity of LTE coverage is guaranteed while the QoS of some services may be impacted.

When load level and distribution fluctuates, some cells may be switched off, but in order to guarantee continuous coverage, others must be kept on or even reconfigured to cover up for those that are in dormant mode. To achieve energy savings in the inter-eNB scenario 2 for energy saving, energy saving approaches can be used. The energy saving approaches are configured by determining which cell is the energy saving cell or compensation cell, how hotspots E-UTRAN cells enters or leaves dormant mode, and how to adjust coverage of the compensation cell. These approaches are as follows.

1) Operations and Management (OAM)-Based Approach

All cells are preconfigured as potential compensation cells and energy saving cells. The decision to enter or leave dormant mode is made based on the proprietary algorithm in each cell configured by the OAM. The neighbor nodes should be informed either by the OAM or by the signaling.

2) Signaling-Based Approach

The cells are aware of whether they are compensation cell or energy saving cell based on the OAM or proprietary information which is knowledge by itself, e.g., UE measurements, interference status, load information, etc. The energy saving cell checks load information of itself, and if the load is less than a threshold for a period of time, the energy saving cell decides to enter dormant mode autonomously or based on information exchanged with the compensation cell. At the same time, the energy saving cell will initialize communication with the corresponding compensation cells, and the coverage related information may be included into the request message. The final decision is made at the compensation cell upon receiving the request message, and the feedback may be needed. If the energy saving cell enters the dormant mode, the compensation cell extends coverage of itself in order to cover service area of served by the energy saving cell.

3) Hybrid OAM and Signaling-Based Approach

The cells are preconfigured as potential compensation cells or energy saving cells by the OAM, and also the OAM communicates to all cells, the values of some parameters that determine the behavior of switching on/off mechanisms.

Based on the inter-eNB scenario for energy saving described above, in 3GPP LTE rel-12, the following four scenarios for non-overlapping coverage scenario may be planned to be considered, which are macro case 1 (single compensation eNB), macro case 2 (multiple compensation eNBs), pico case 1 (single compensation eNB), and pico case 2 (multiple compensation eNBs).

Figure 5:
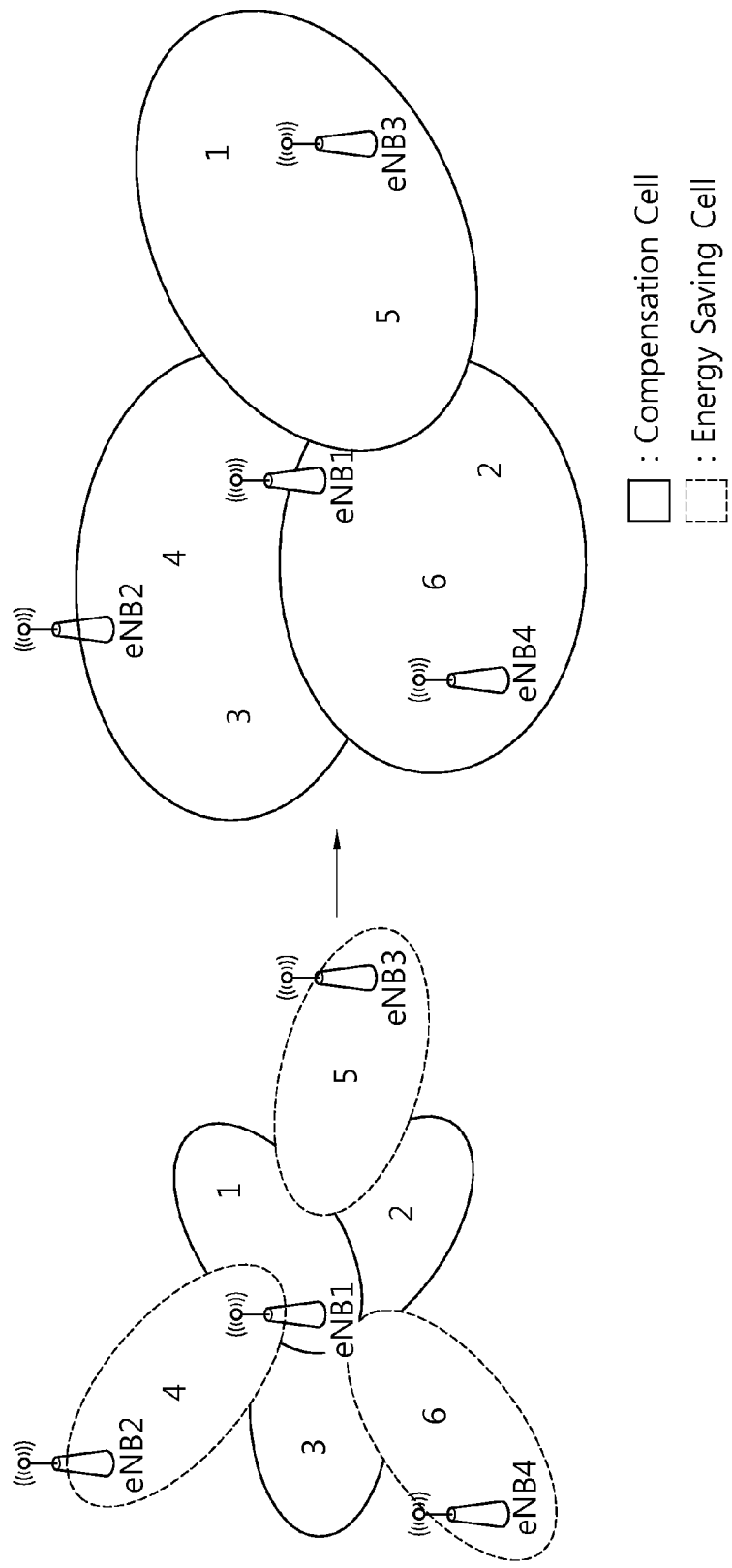
FIG. 5 shows an example of an inter-eNB scenario for energy saving.

FIG. 5 shows an example of an inter-eNB scenario for energy saving. FIG. 5 show a macro case 1, which refers that a single compensation macro eNB provides a basic coverage for energy saving. Single layer coverage of E-UTRAN cells is deployed. At off-peak time, energy saving cells which may belong to different eNBs (e.g., cell 4 of eNB2, cell 5 of eNB3 and cell 6 of eNB4) may enter dormant mode, while the basic coverage is provided by one or more cells of one eNB (e.g., cell 1, 2 and 3 of eNB1).

Figure 6:
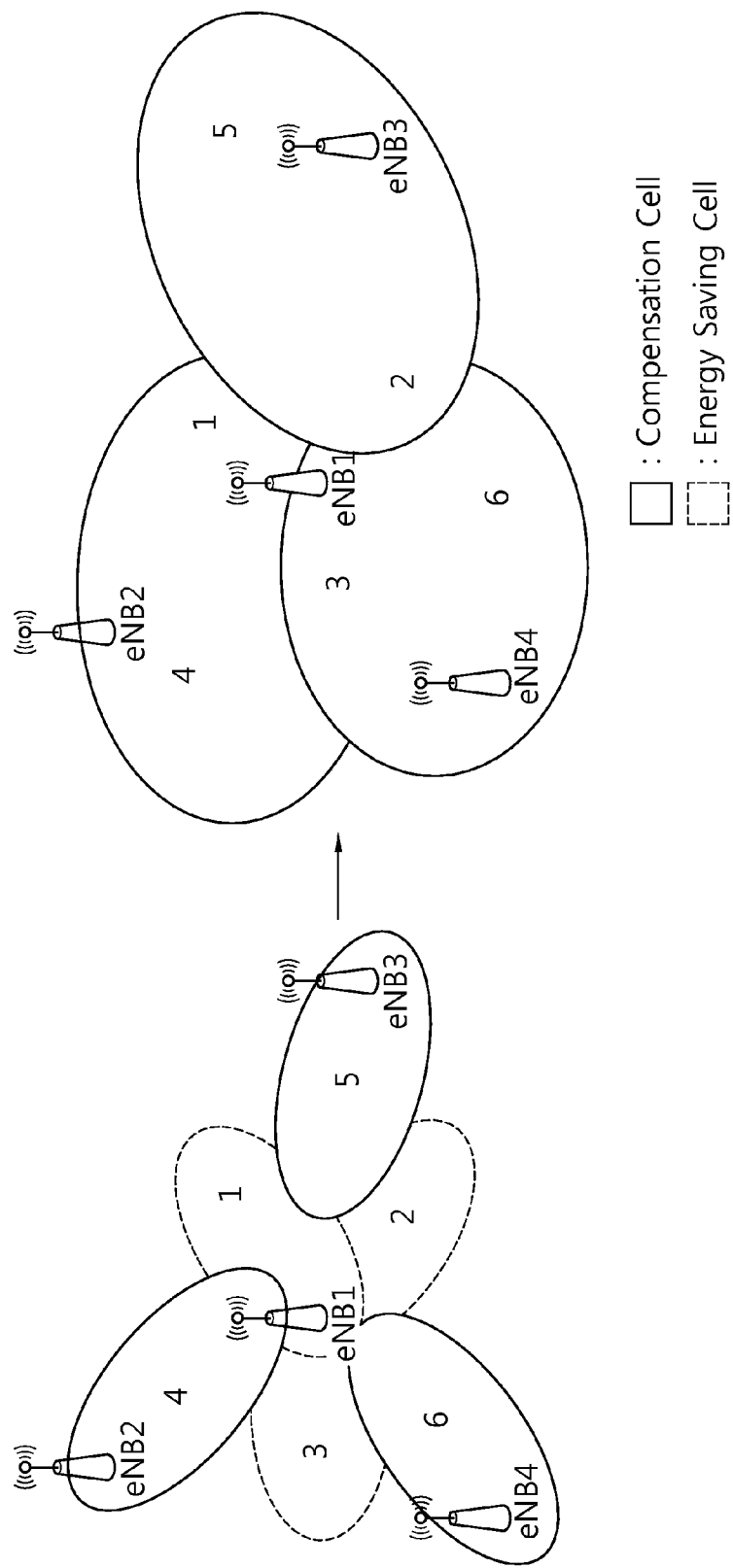
FIG. 6 shows another example of an inter-eNB scenario for energy saving.

FIG. 6 shows another example of an inter-eNB scenario for energy saving. FIG. 6 show a macro case 2, which refers that multiple compensation macro eNBs provide a basic coverage for energy saving. Single layer coverage of E-UTRAN cells is deployed. At off-peak time, one or more cells (e.g., cell 1, 2 and 3 of eNB1) of one eNB enter(s) dormant mode and two or more adjacent compensation cells belonging to different eNBs (e.g., cell 4 of eNB2, cell 5 of eNB3 and cell 6 of eNB4) extend their coverage to provide basic coverage to UEs in dormant cells area.

Figure 7:
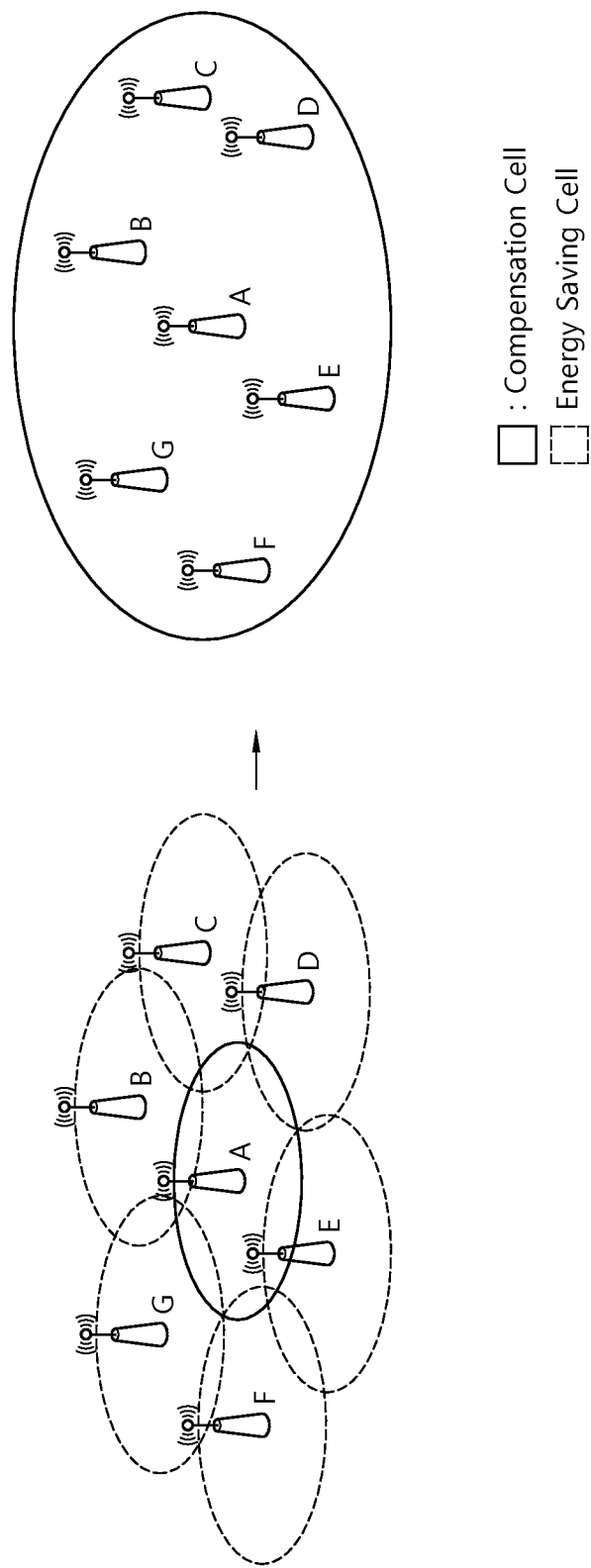
FIG. 7 shows another example of an inter-eNB scenario for energy saving.

FIG. 7 shows another example of an inter-eNB scenario for energy saving. FIG. 7 show a pico case 1, which refers that a single compensation pico eNB provides a basic coverage for energy saving. Single layer of interference limited coverage of E-UTRAN pico cells is deployed. At off-peak time, all energy saving cells enter dormant mode, while the basic coverage is provided by one pico cell.

Figure 8:
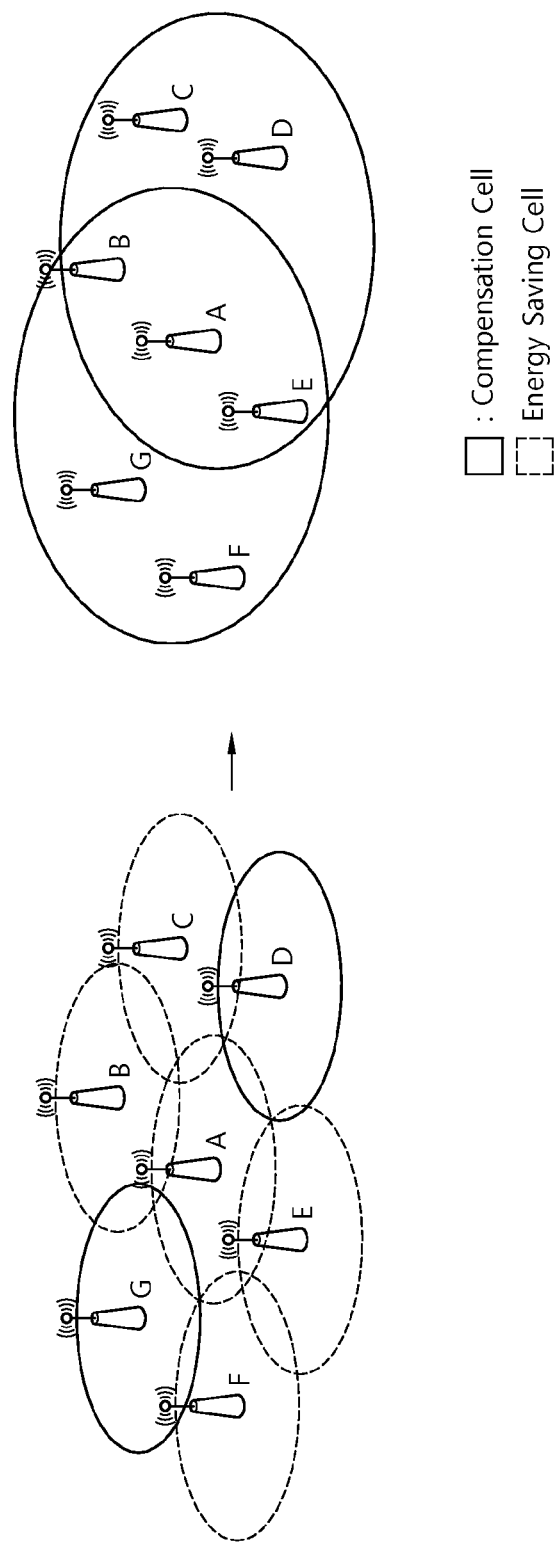
FIG. 8 shows another example of an inter-eNB scenario for energy saving.

FIG. 8 shows another example of an inter-eNB scenario for energy saving. FIG. 8 show a pico case 2, which refers that multiple compensation pico eNBs provide a basic coverage for energy saving. Single layer coverage of E-UTRAN cells is deployed. At off-peak time, one or more pico cell(s) enters dormant mode and one or more compensation pico cells provide basic coverage to UEs in dormant pico cell area.

Furthermore, based on the inter-eNB scenario for energy saving described above, in 3GPP LTE rel-12, the following scenario for overlapping coverage scenario may be planned to be considered.

Figure 9:
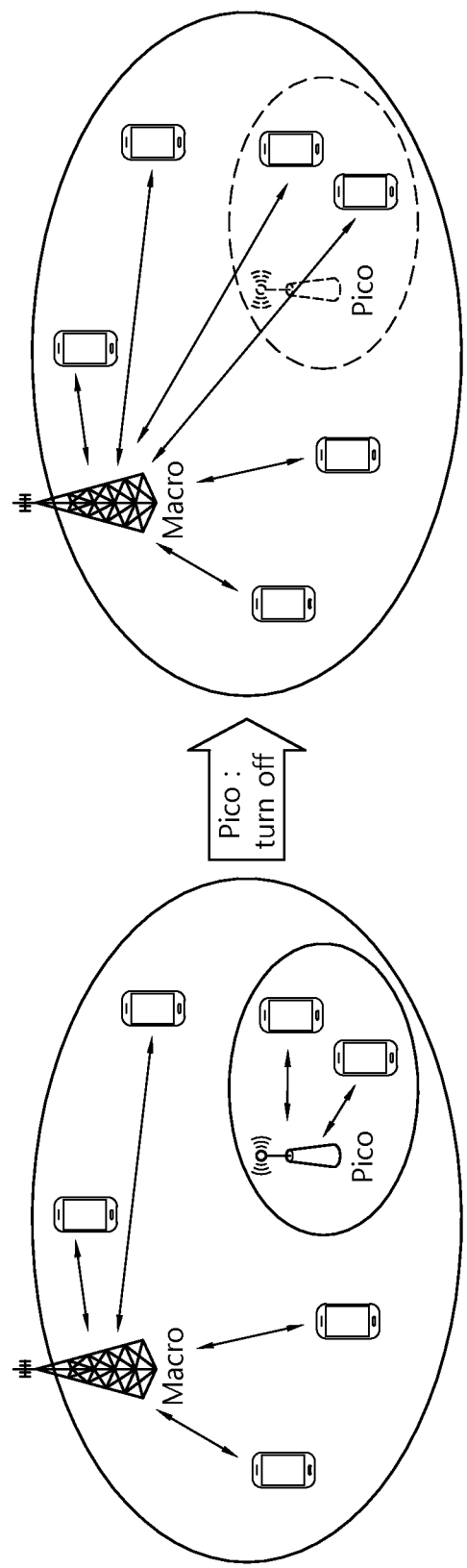
FIG. 9 shows another example of an inter-eNB scenario for energy saving.

FIG. 9 shows another example of an inter-eNB scenario for energy saving. Referring to FIG. 9, a pico cell is located in macro cell area. Coverage of the macro cell overlaps coverage of the pico cell. In this scenario, the pico cell is an energy saving cell and the macro cell is a compensation cell. At off-peak time, the pico cell enters dormant mode and the macro cell provides basic coverage to UEs in dormant pico cell area.

Regarding five scenarios for energy saving described above, when the eNB of the energy saving cell makes a decision to turn off its cell, it has to consider whether UEs, which are receiving services from the energy saving cell, can be served at the compensation cell stably or not. That is, unless UEs receiving services from the energy saving cell are all guaranteed to be served with sufficient throughputs in the compensation cell, the eNB of the energy saving cell should not turn off its cell. Therefore, before turning off cell, the procedure to check the capability of the compensation cell is required. However, this kind of functions has not yet defined in 3GPP LTE specification, currently.

Hereinafter, a method for transmitting a list of E-UTRAN radio access bearers (E-RABs) according to embodiments of the present invention is described. According to the embodiments of the present invention, the eNB of the energy saving cell may transmit a list of minimum required E-RABs or a list of required E-RABs to the eNB of the compensation cell. Upon receiving the list of minimum required E-RABs or the list of required E-RABs, the eNB of the compensation cell may check whether the compensation cell is able to provide all of minimum required E-RABs or not, or may check a list of E-RABs which the compensation cell is able to support. Accordingly, before the energy saving cell is turned off, the capability of the compensation cell can be checked.

Figure 10:
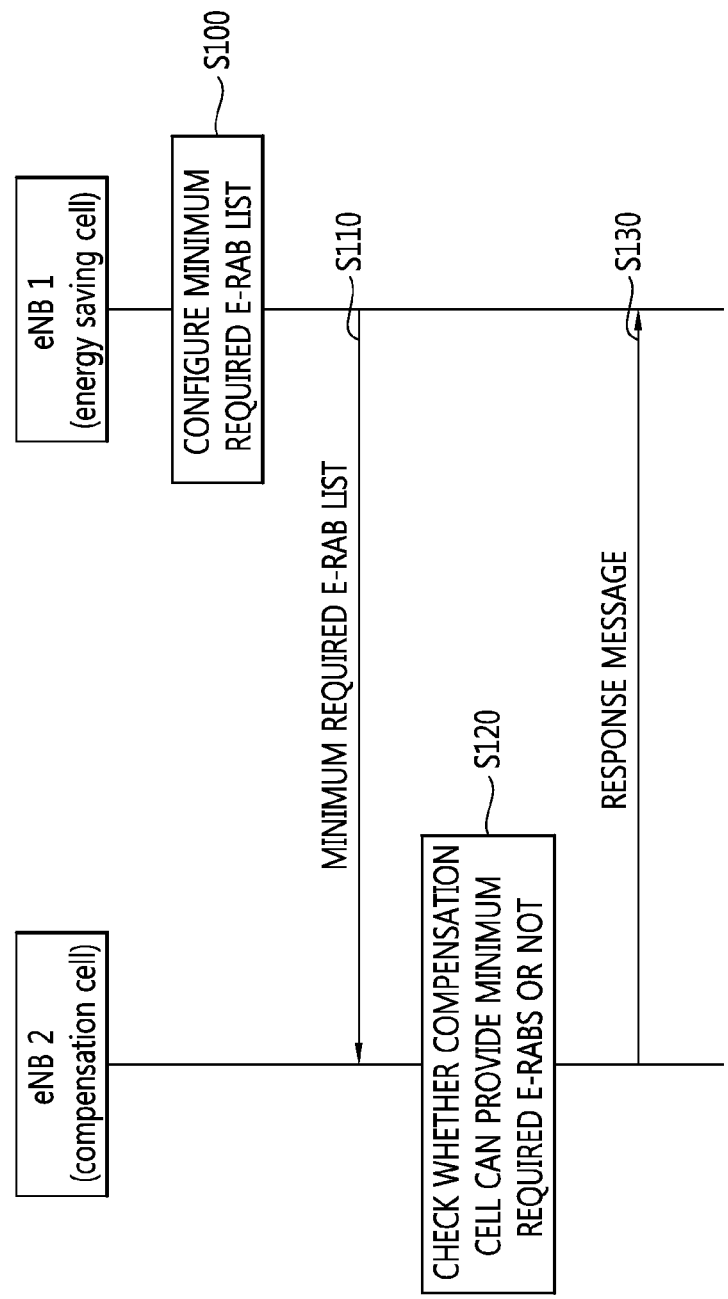
FIG. 10 shows an example of a method for transmitting a list of E-RABs according to an embodiment of the present invention.

FIG. 10 shows an example of a method for transmitting a list of E-RABs according to an embodiment of the present invention.

Referring to FIG. 10, in step S100, an eNB1 of an energy saving cell configures a list of minimum required E-RABs. The list of minimum required E-RABs may be a list of E-RABs which should be supported in a compensation cell in order to satisfy the minimum required service qualities of UEs which are being served in the energy saving cell currently. Table 1 shows an example of a list of minimum required E-RABs.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Target Cell ID | M | | ECGI 9.2.14 | | YES | reject |
| >E-RABs To Be Setup List | | 1 | | | — | — |
| >>E-RABs To Be Setup Item | | 1 . . . <max noof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |

Referring to Table 1, "E-RABs To Be Setup List" field indicates the list of minimum required E-RABs, and "E-RABs To Be Setup Item" field indicate each of minimum required E-RABs.

Also, the list of minimum required E-RABs may include necessary QoS parameters for each E-RAB, which is indicated by "E-RAB Level QoS Parameters" field in Table 1. The "E-RAB Level QoS Parameters" field may use Table 2 described below. Table 2 may be referred to Section 9.2.9 of 3GPP TS 36.423 V11.2.0 (2012-09).

TABLE 2

| IE/Group Name | Presence | Range | IE type and reference | Semantics description | Criticality | Assigned Criticality |
|---|---|---|---|---|---|---|
| QCI | M | | INTEGER (0 . . . 255) | QoS Class Identifier defined in TS 23.401 [12]. Logical range and | — | — |

TABLE 2-continued

| IE/Group Name | Presence | Range | IE type and reference | Semantics description | Criticality | Assigned Criticality |
|---|---|---|---|---|---|---|
| | | | | coding specified in TS 23.203 [13]. | | |
| Allocation and Retention Priority | M | | 9.2.31 | | — | — |
| GBR QoS Information | O | | 9.2.10 | This IE applies to GBR bearers only and shall be ignored otherwise. | — | — |

In step S110, the eNB1 transmits the configured list of minimum required E-RABs to an eNB2 of the compensation cell.

In step S120, the eNB2 checks whether the compensation cell is able to provide all E-RABs included in the configured list of minimum required E-RABs. If all E-RABs included in the configured list of minimum required E-RABs are not fully supported, then the energy saving cell cannot be turned off.

In step S130, the eNB2 transmits a response message to the eNB1. If it is determined that the compensation cell cannot provide all E-RABs included in the configured list of minimum required E-RABs, the response message may indicate that the compensation cell cannot compensate UEs in the energy saving cell. If it is determined that the compensation cell can provide all E-RABs included in the configured list of minimum required E-RABs, the response message may indicate that the compensation cell can compensate UEs in the energy saving cell.

Upon receiving the response message, the eNB1 may perform action according to the received response message. If the response message indicates that the compensation cell cannot compensate UEs in the energy saving cell, the eNB1 does not turn off the energy saving cell. If the response message indicates that the compensation cell can compensate UEs in the energy saving cell, the eNB1 turn off the energy saving cell, and enters the dormant mode.

Figure 11:
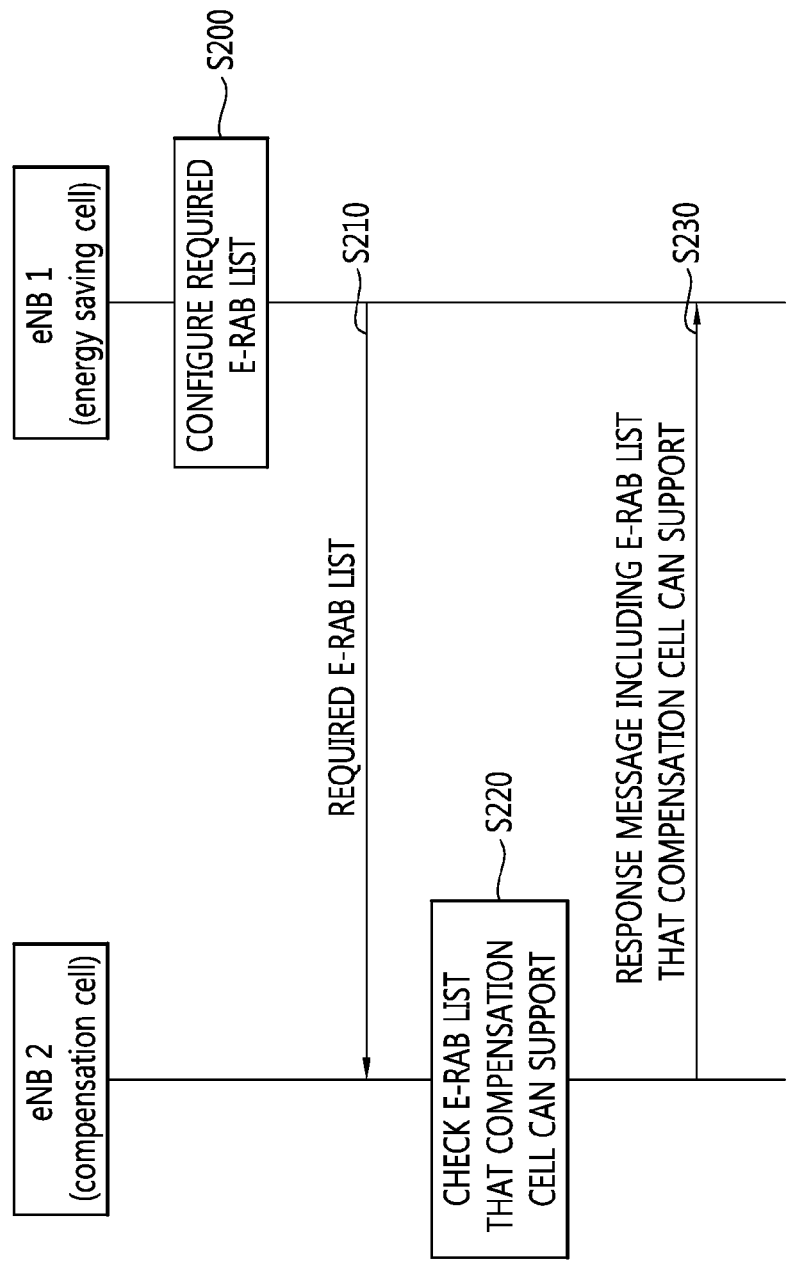
FIG. 11 shows an example of a method for transmitting a list of E-RABs according to another embodiment of the present invention.

FIG. 11 shows an example of a method for transmitting a list of E-RABs according to another embodiment of the present invention.

Referring to FIG. 11, in step S200, an eNB1 of an energy saving cell configures a list of required E-RABs. The list of required E-RABs may be a list of E-RABs which are expected to be supported in a compensation cell. Table 3 shows an example of a list of required E-RABs.

Setup Item" field indicate each of required E-RABs. Also, the list of required E-RABs may include necessary QoS parameters for each E-RAB, which is indicated by "E-RAB Level QoS Parameters" field in Table 3. The "E-RAB Level QoS Parameters" field may use Table 2 described above.

In step S210, the eNB1 transmits the configured list of required E-RABs to an eNB2 of the compensation cell.

In step S220, the eNB2 checks whether the compensation cell is able to provide E-RABs included in the configured list of required E-RABs. Accordingly, the eNB2 may determine a list of E-RABs that the compensation cell is able to support.

In step S230, the eNB2 transmits a response message, which includes the list of E-RABs that the compensation cell is able to support, to the eNB1.

Upon receiving the response message, the eNB1 decides to whether to turn off the energy saving cell or not based on the list of E-RABs that the compensation cell is able to support included in the response message. The eNB1 may transfer some or all of E-RABs that the compensation cell is able to support to the compensation cell.

Figure 12:
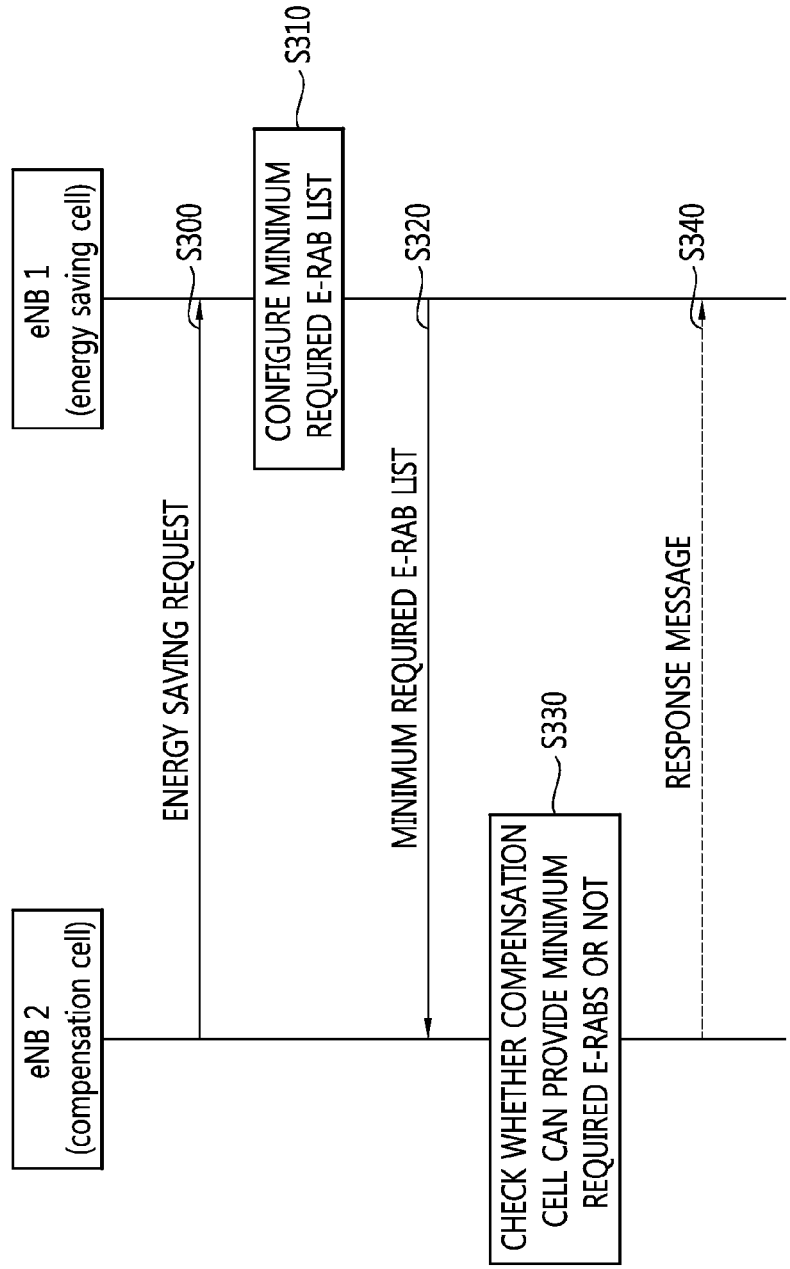
FIG. 12 shows an example of a method for transmitting a list of E-RABs according to another embodiment of the present invention.

FIG. 12 shows an example of a method for transmitting a list of E-RABs according to another embodiment of the present invention.

Referring to FIG. 12, in step S300, an eNB2 of a compensation cell transmits an energy saving request message to an eNB1 of an energy saving cell.

In step S310, the eNB1 configures a list of minimum required E-RABs. The list of minimum required E-RABs may be a list of E-RABs which should be supported in a compensation cell in order to satisfy the minimum required service qualities of UEs which are being served in the energy saving cell currently. Table 1 described above may be used for the list of minimum required E-RABs. Also, the list of minimum required E-RABs may include necessary QoS

TABLE 3

| IE/Group Name | Presence | Range | IE type and reference | Semantics description | Criticality | Assigned Criticality |
|---|---|---|---|---|---|---|
| Message Type | M | | 9.2.13 | | YES | reject |
| Target Cell ID | M | | ECGI 9.2.14 | | YES | reject |
| >E-RABs To Be Setup List | | 1 | | | — | — |
| >>E-RABs To Be Setup Item | | 1 ... <max noof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |

Referring to Table 3, "E-RABs To Be Setup List" field indicates the list of required E-RABs, and "E-RABs To Be parameters for each E-RAB. Table 2 described above may be used for the necessary QoS parameters for each E-RAB.

In step S320, the eNB1 transmits the configured list of minimum required E-RABs to the eNB2.

In step S330, the eNB2 checks whether the compensation cell is able to provide all E-RABs included in the configured list of minimum required E-RABs. If all E-RABs included in the configured list of minimum required E-RABs are not fully supported, then the energy saving cell cannot be turned off. The eNB2 may decide to request the eNB1 to maintain the turn-on state of the energy saving cell.

In step S340, the eNB2 may transmit a response message to the eNB1. If it is determined that the compensation cell cannot provide all E-RABs included in the configured list of minimum required E-RABs, the response message may request the eNB1 not to turn off the energy saving cell. If it is determined that the compensation cell can provide all E-RABs included in the configured list of minimum required E-RABs, the response message may request the eNB1 to turn off the energy saving cell.

Figure 13:
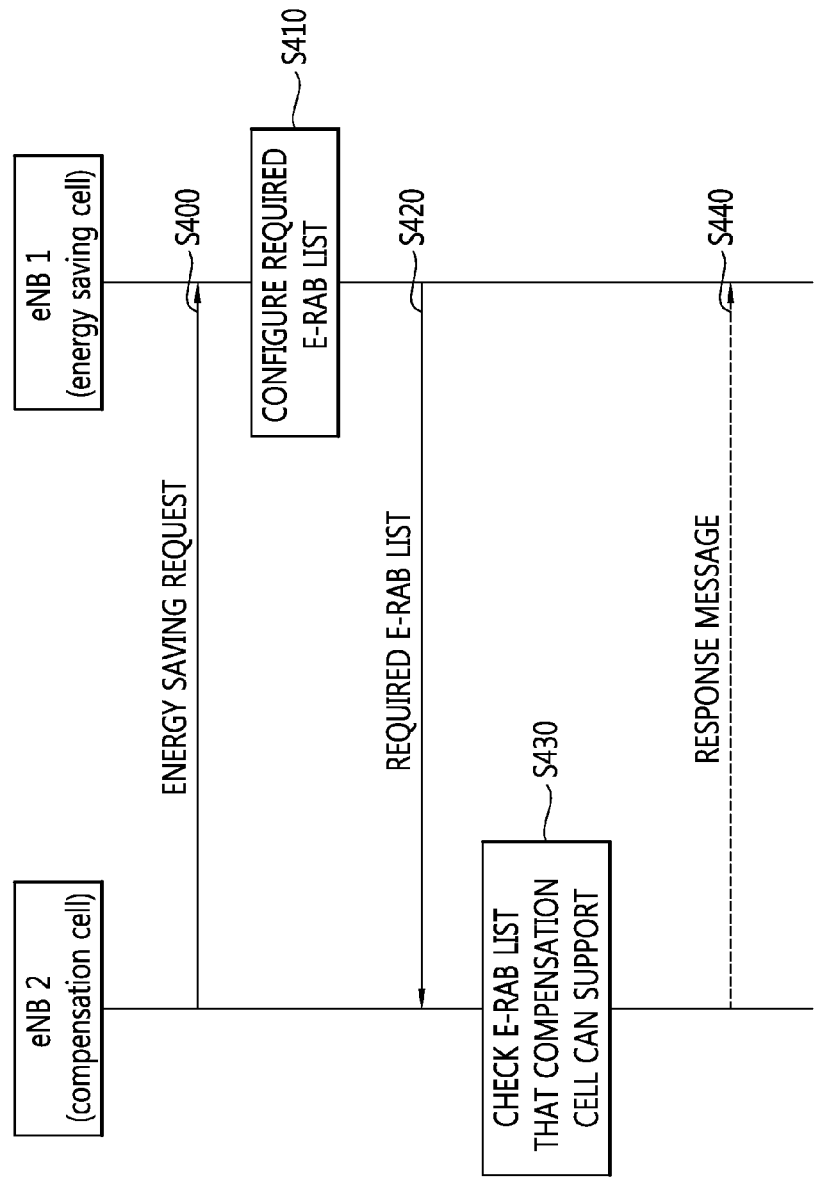
FIG. 13 shows an example of a method for transmitting a list of E-RABs according to another embodiment of the present invention.

FIG. 13 shows an example of a method for transmitting a list of E-RABs according to another embodiment of the present invention.

Referring to FIG. 13, in step S400, an eNB2 of a compensation cell transmits an energy saving request message to an eNB1 of an energy saving cell.

In step S410, the eNB1 configures a list of required E-RABs. The list of required E-RABs may be a list of E-RABs which are expected to be supported in a compensation cell. Table 3 described above may be used for the list of required E-RABs. Also, the list of required E-RABs may include necessary QoS parameters for each E-RAB. Table 2 described above may be used for the necessary QoS parameters for each E-RAB.

In step S420, the eNB1 transmits the configured list of required E-RABs to the eNB2.

In step S430, the eNB2 checks whether the compensation cell is able to provide E-RABs included in the configured list of required E-RABs. Accordingly, the eNB2 may determine a list of E-RABs that the compensation cell is able to support. Based on the checked E-RABs that the compensation cell is able to support, the eNB2 may decide to whether turn off the energy saving cell or not.

In step S440, the eNB2 may transmit a response message to the eNB1.

Figure 14:
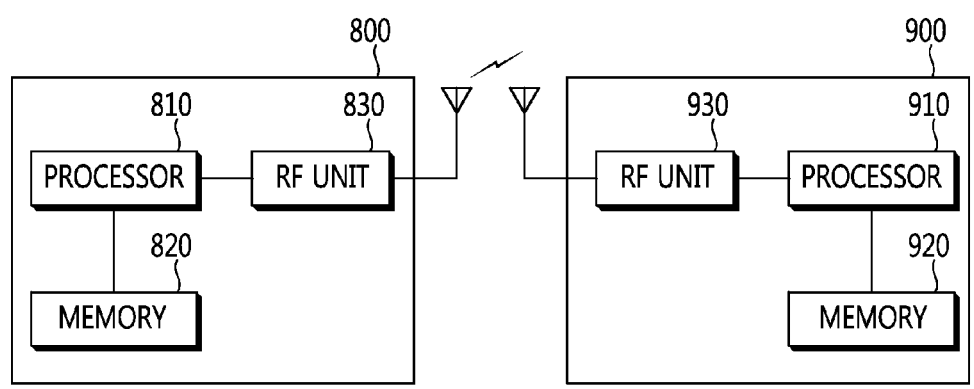
FIG. 14 shows a wireless communication system to implement an embodiment of the present invention.

FIG. 14 shows a wireless communication system to implement an embodiment of the present invention.

A first eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, before the energy saving cell is turned off, the capability of the compensation cell can be checked.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a first eNodeB (eNB) of an energy saving cell, a list of bearers in a wireless communication system, the method comprising:

receiving, by the first eNB of the energy saving cell, an energy saving request message from a second eNB of a compensation cell;

configuring, by the first eNB of the energy saving cell, a list of evolved universal mobile telecommunications system (UMTS) terrestrial radio access network (E-UTRAN) radio access bearers (E-RABs);

transmitting, by the first eNB of the energy saving cell, the configured list of E-RABs to the second eNB of the compensation cell;

receiving, by the first eNB of the energy saving cell, a response message from the second eNB of the compensation cell, wherein the response message includes an indication whether the compensation cell is able to support all E-RABs included in the configured list of E-RABs or not; and determining, by the first eNB of the energy saving cell, whether to turn off the energy saving cell or not based on the indication included in the response message.

2. The method of claim 1, wherein the list of E-RABs is a list of minimum required E-RABs.

3. The method of claim 2, wherein the list of minimum required E-RABs is a list of E-RABs which should be supported by the compensation cell in order to satisfy minimum required service qualities of user equipments (UEs) who are being served by the energy saving cell.

4. The method of claim 1, wherein the list of E-RABs is a list of required E-RABs.

5. The method of claim 4, wherein the list of required E-RABs is a list of E-RABs which are expected to be supported by the compensation cell.

6. The method of claim 4, wherein the second eNB of the compensation cell checks whether the compensation cell is able to support all E-RABs included in the configured list of E-RABs or not.

7. The method of claim 1, wherein the list of E-RABs includes QoS parameters for each E-RAB includes in the list of E-RABs.

8. The method of claim 1, further comprising:
   determining whether to turn off the energy saving cell or not,
   wherein the energy saving cell is turned off if it is determined that the compensation cell is able to support all E-RABs included in the configured list of E-RABs, or the energy saving cell is not turned off if it is checked that the compensation cell is not able to support all E-RABs included in the configured list of E-RABs.

9. The method of claim 1, wherein the energy saving cell and the compensation cell are macro cells.

10. The method of claim 1, wherein the energy saving cell and the compensation cell are pico cells.

11. A method for checking, by a second eNodeB (eNB) of a compensation cell, a list of bearers in a wireless communication system, the method comprising:
    transmitting, by the second eNB of the compensation cell, an energy saving request message to a first eNB of an energy saving cell;
    receiving, by the second eNB of the compensation cell, a list of minimum required evolved universal mobile telecommunications system (UMTS) terrestrial radio access network (E-UTRAN) radio access bearers (E-RABs) from the first eNB of the energy saving cell;
    checking, by the second eNB of the compensation cell, whether the compensation cell is able to support all E-RABs included in the list of minimum required E-RABs or not;
    determining, by the second eNB of the compensation cell, whether to turn off the energy saving cell or not based on the checking; and
    transmitting by the second eNB of the compensation cell a response message to the first eNB of the energy saving cell,
    wherein the response message includes an indication of whether to turn off the energy saving cell or not.

12. A method for checking, by a second eNodeB (eNB) of a compensation cell, a list of bearers in a wireless communication system, the method comprising:
    transmitting, by the second eNB of the compensation cell, an energy saving request message to a first eNB of an energy saving cell;
    receiving, by the second eNB of the compensation cell, a list of required evolved-universal mobile telecommunications system (UMTS) terrestrial radio access network (E-UTRAN) radio access bearers (E-RABs) from the first eNB of the energy saving cell;
    checking, by the second eNB of the compensation cell, whether the compensation cell is able to support E-RABs included in the list of required E-RABs or not;
    determining, by the second eNB of the compensation cell, whether to turn off the energy saving cell or not based on the checking; and
    transmitting, by the second eNB of the compensation cell, a response message to the first eNB of the energy saving cell,
    wherein the response message includes an indication of whether to turn off the energy saving cell or not.

* * * * *